United States Patent
Kusunoki

[11] Patent Number: 6,072,295
[45] Date of Patent: Jun. 6, 2000

[54] WINDSHIELD WIPING DEVICE FOR VEHICLE

[75] Inventor: Kiichi Kusunoki, Kanagawa-ken, Japan

[73] Assignee: Nissan Motor Co., Ltd., Kanagawa-ken, Japan

[21] Appl. No.: 09/201,834

[22] Filed: Dec. 1, 1998

[30] Foreign Application Priority Data

Dec. 1, 1997 [JP] Japan .................................. 9-330601

[51] Int. Cl.$^7$ ...................................................... B60S 1/08
[52] U.S. Cl. ..................... 318/444; 318/DIG. 2; 388/903
[58] Field of Search .................... 318/443, 444, 318/DIG. 2; 388/903, 909; 15/250.12

[56] References Cited

U.S. PATENT DOCUMENTS 5,245,259  9/1993  Nakamura et al. ................. 318/443
5,559,410  9/1996  Papazian et al. .................. 318/445

*Primary Examiner*—Bentsu Ro
*Attorney, Agent, or Firm*—McDermott, Will & Emery

[57] ABSTRACT

A windshield wiping device includes a control amplifier 5 for controlling a wiper motor 7 in accordance with a driver's operation of a wiper switch 3. When a vehicle is energized, the control amplifier 5 once outputs a working inhibition signal to a working inhibition relay 15 in order to stop the operation of the wiper. Thus, it is possible to avoid the wiper's working against the driver's will immediately after a key switch has been switched on. When the vehicle begins to travel or the position of the wiper switch 3 is changed by the driver, then the wiper is activated in accordance with the position of the wiper switch 3.

6 Claims, 8 Drawing Sheets

WINDSHIELD WIPING DEVICE FOR VEHICLE

BACKGROUND OF THE INVENTION

1. Field of the Invention

The present invention relates to a windshield wiping device for wiping a windshield of a vehicle or the like.

2. Description of Related Art

As such a windshield wiping device installed on the vehicle, a step-less intermittent type of windshield wiping device is known. In this wiping device, under condition that the vehicle is energized, that is, when a key switch (or an ignition switch) occupies either one of an "IGN (ignition)" position and an "ACC (accessories)" position, an operation of a wiper can be controlled by manipulating a wiper switch disposed in the vicinity of a driver's seat. When the wiper switch is at an "OFF" position, the operation of the wiper is stopped. In case of an "INT (intermittent)" position of the wiper switch, the wiper is intermittently operated at intervals established by an intermittent period adjusting volume switch. At a "LO (low)" position of the wiper switch, the wiper is driven slowly. Conversely, at a "HI (high)" position of the wiper switch, the wiper is driven at a high speed in comparison with a speed of the wiper in case of the "LO" position of the wiper switch.

Furthermore, an automatic intermittent and raindrop-sensitive type of windshield wiping device is also known. Detecting the intensity of rain by a raindrop sensor attached on the vehicle, the windshield wiping device of this kind is capable of changing an intermittent period of the wiper's operation automatically in accordance with the detected intensity of rain. Also in operation of the windshield wiping device, an operational mode of the wiper is controlled by manipulating a wiper switch which can occupy each of the positions of "OFF", "AUTO (automatic)", "LO" and "HI". Only when the wiper switch occupies the "AUTO" position, the intermittent period of the wiper's operation is automatically adjusted in accordance with the intensity of rain. Therefore, in view of avoiding the driver's burdensome operations during driving, the driver usually uses the windshield wiping device while positioning the wiper switch at the "AUTO" position.

In the above-mentioned step-less intermittent type of windshield wiping device, however, there is a case that the vehicle is again energized (key switch: ACC or IGN) while the wiper switch is not put back in the "OFF" position after finishing the previous driving. In such a case, the wiper would be actuated against the driver's will, corresponding to the position of the wiper switch at the moment.

In the above-mentioned automatic intermittent and raindrop-sensitive type of windshield wiping device, if the vehicle is energized in the rain on condition that the wiper switch still occupies "AUTO" position, there is a possibility that the wiper is operated in a manner apart from the driver's will. Additionally, if an alien substance exists on a wiping area of the wiper, the substance itself, the windshield, the vehicle or the like will be damaged.

Additionally, in the automatic intermittent and raindrop-sensitive type of windshield wiping device, if the vehicle is washed in an automatic car-washing machine while the wiper switch is still being at the "AUTO" position, then the rain-drop sensor will detect the water for washing to operate the wiper, so that washing instruments, the wiper and the vehicle are damaged unfortunately.

SUMMARY OF THE INVENTION

It is therefore an object of the present invention to provide a windshield wiping device which is capable of preventing a wiper from recklessly operating against the driver's will, just after the power has been supplied into the device.

The above-mentioned object of the present invention can be accomplished by a windshield wiping device for a vehicle comprising:

a wiper for wiping a windshield of the vehicle;

a wiper switch to be operated by a driver of the vehicle, for controlling the wiper, the wiper switch being capable of occupying various positions;

a wiper motor for driving the wiper in accordance with the driver's operation of the wiper switch;

a switch situation detecting section for detecting whether the wiper switch occupies any one of the various positions except an "OFF" position where the wiper is inactivated; and a current supply prohibiting section for prohibiting a supply of driving current to the wiper motor when the driver switches a key switch on while it is being detected that the wiper switch occupies any one of the various positions except the "OFF" position by the switch situation detecting section.

Repeatedly, when it is detected that the wiper switch occupies any one of the various positions except the "OFF" position by the switch situation detecting section, the current supply prohibiting section operates to prohibit the supply of driving current to the wiper motor. Therefore, according to the invention, it is possible to prevent the wiper from operating against the driver's will just after the vehicle has been energized (key switch: ON).

In the present invention, preferably, the windshield wiping device further comprises:

a vehicle condition detecting section for detecting a change of the vehicle's condition on the basis of the driver's operation to travel the vehicle; and a current supply allowing section for allowing the supply of driving current to the wiper motor when the change of the vehicle's condition is detected by the vehicle condition detecting section after the supply of driving current has been prohibited by the current supply prohibiting section.

According to the above-mentioned preferred modification of the invention, after the supply of driving current has been prohibited by the current supply prohibiting section and when the change of the vehicle's condition is detected by the vehicle condition detecting section, the current supply allowing section operates to allow the supply of driving current to the wiper motor. Consequently, it is possible to operate the wiper while reflecting the driver's will.

In the present invention, more preferably, the vehicle condition detecting section is adapted so as to detect any one of a beginning of traveling the vehicle, an operation of a gear shifting lever of the vehicle and a releasing of an emergency brake lever of the vehicle, as the change of the vehicle's condition.

According to the above-mentioned preferred modification of the invention, when any one of a beginning of traveling the vehicle, an operation of a gear shifting lever of the vehicle and a releasing of an emergency brake lever of the vehicle is detected, then the current supply allowing section operates to withdraw the prohibition of supplying the driving current to the wiper motor, which has been carried out by the current supply prohibiting section. In this case, it is possible to operate the wiper in accordance with the position of the wiper switch established at that time.

Note, the various positions that the wiper switch can occupy may contain at least an "INT" or "AUTO" position where the wiper is operated intermittently, a "LO" position where the wiper is operated slowly and a "HI" position where the wiper is operated rapidly.

Additionally, the object of the present invention can be also accomplished by a windshield wiping device for a vehicle comprising:

a wiper for wiping a windshield of the vehicle;

a wiper switch to be operated by a driver of the vehicle, for controlling of the wiper, the wiper switch being capable of occupying various positions;

a wiper motor for driving the wiper in accordance with the driver's operation of the wiper switch;

a current supply prohibiting section for prohibiting a supply of driving current to the wiper motor when the driver switches a key switch on; and a current supply allowing section for withdrawing the prohibition of supplying the driving current to the wiper motor, which has been carried out by the current supply prohibiting section, when the wiper switch is operated by the driver.

Repeatedly, when the vehicle is energized (key switch: ON), then the current supply prohibiting section operates to once prohibit the supply of driving current to the wiper motor. In this case, it is possible to prevent the wiper from operating against the driver's will just after the vehicle has been energized. Thereafter, when the wiper switch is operated by the driver, the current supply allowing section operates to withdraw the prohibition of supplying the driving current to the wiper motor, which has been carried out by the current supply prohibiting section. In this case, it is possible to operate the wiper while reflecting the driver's will.

In the windshield wiping device mentioned above, the various positions that the wiper switch can occupy may contain at least an "OFF" position where the wiper is inactivated, an "INT" or "AUTO" position where the wiper is operated intermittently, a "LO" position where the wiper is operated slowly and a "HI" position where the wiper is operated rapidly.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

Embodiments of the present invention will be described with reference to the accompanying drawings.

(1st. Embodiment)

Figure 1:
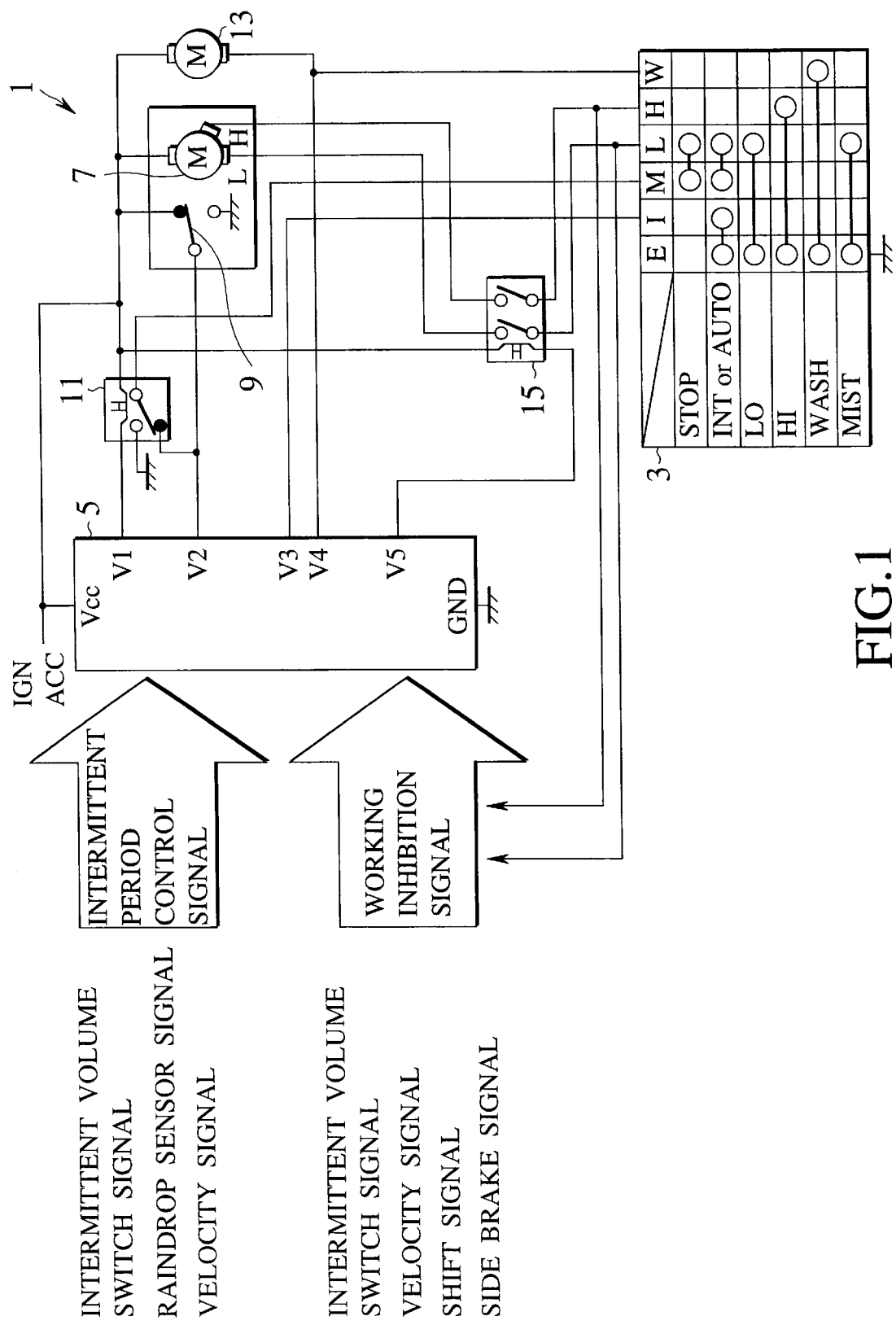
FIG. 1 is a systematic circuit diagram of a windshield wiping device in accordance with a first embodiment of the present invention.

FIG. 1 is a systematic circuit diagram of a windshield wiping device 1 in accordance with a first embodiment of the present invention. It is noted that the windshield wiping device 1 is constituted by a velocity-sensitive and step-less intermittent (raindrop-sensitive and automatic-intermittent) type of front windshield wiping device which carries out high and low-speed operations and intermittent operation of the wiper in response to the driver's operations of a wiper switch.

In FIG. 1, the wiper switch 3 is provided for changing the operation of the wiper among stop of the wiper, an intermittent (or automatic) operation, a continuous operation at low speed, a continuous operation at high speed, a washer operation and mist operation.

Figure 2:
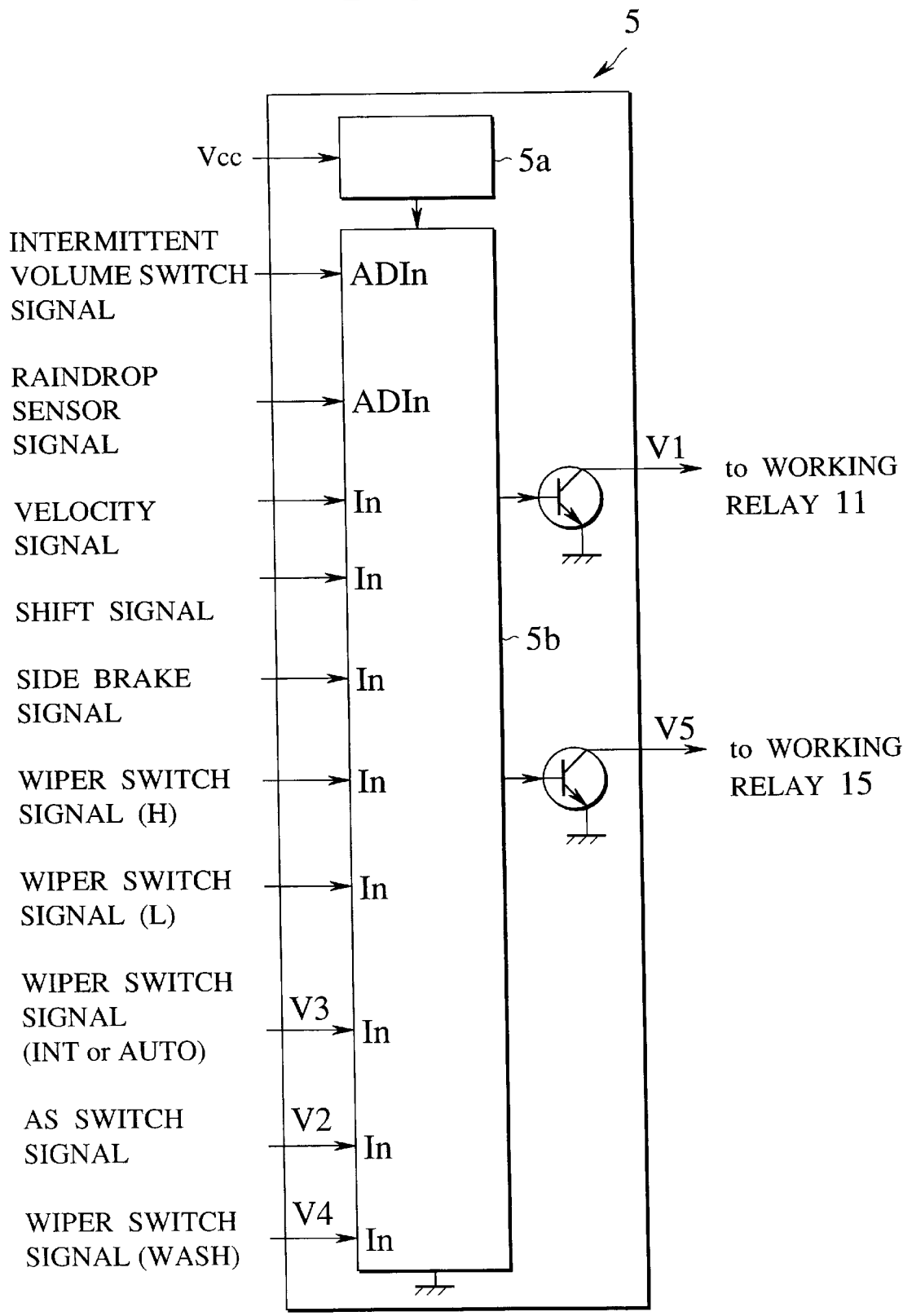
FIG. 2 is a block diagram of a control amplifier constituting the windshield wiping device of FIG. 1.

FIG. 2 shows a constitution of a control amplifier 5 as a main constituent of the windshield wiping device 1. As shown in the figure, the control amplifier comprises a constant-voltage source 5a, i.e. a battery and a microcomputer 5b driven by the constant-voltage source 5a. The microcomputer 5b comprises an input port to input various signals, an output port to output various signal, a CPU (central processing unit), memory units (RAM, ROM) and a bus for interconnecting these elements although all of the above-mentioned elements are not shown in the figure.

Under condition that the wiper switch 3 occupies in either position of "INT (intermittent)" or "AUTO (automatic)", the control amplifier 5 drives the wiper on the basis of an intermittent period control signal. Note, the intermittent period signal is representative of an intermittent period calculated by an intermittent volume switch signal generated from an intermittent period adjusting volume switch, a raindrop sensor signal from a raindrop detecting sensor and a velocity signal from a vehicle-speed sensor. When the power is supplied, the control amplifier 5 controls so as to restrict the operation of the wiper. On the other hand, the control amplifier 5 also serves to release the wiper from its restricted condition on the basis of any of the intermittent volume switch signal, the vehicle-speed signal, a shift signal representing a position of a shift lever and a side brake signal representing a condition of an emergency brake.

Note, the intermittent period adjusting volume switch is provided on the velocity-sensitive and step-less intermittent wiping device, for adjusting an intermittent period of the working wiper in response to the driver's operation. The raindrop detecting sensor is provided on the raindrop-sensitive and automatic intermittent wiping device, for detecting an amount and pressure of the raindrops attacking on a sensing surface. Owing to the provision of a rotary encoder in the transmission, the vehicle-speed sensor generates pulse signals representative of revolutions of the transmission, so that the velocity of vehicle can be obtained.

A wiper motor 7 is provided for driving the wiper at low and high speed corresponding to the magnitude of driving current supplied from a power source. When the wiper switch 3 is turned off while the wiper occupies besides a predetermined position, an AS (auto stop) switch 9 serves to supply the driving current to the wiper motor 7 till the wiper returns to the predetermined position. In operation, a contact of the AS switch 9 is turned to the power source when the wiper is in the predetermined position. On the contrary, when the wiper is in any position except for the predetermined position, the contact of the AS switch 9 is switched to the ground. A working relay 11 is provided for controlling the intermittent period of the wiper motor 7. The contact of the relay 11 is alternatively switched between the power source and the ground, in response to the wiper driving signal from the control amplifier 5. A washer motor 13 is driven by manipulating the wiper switch 3, so that the cleaning liquid is ejected from nozzles having holes directing to a front windshield.

Provided for controlling the working of the wiper motor 7 is a working inhibition relay 15 which opens or closes the contacts in response to a working inhibition signal from the control amplifier 5.

Referring to FIGS. 3 to 6, we describe the operation of the wiper device 1.

Figure 3:
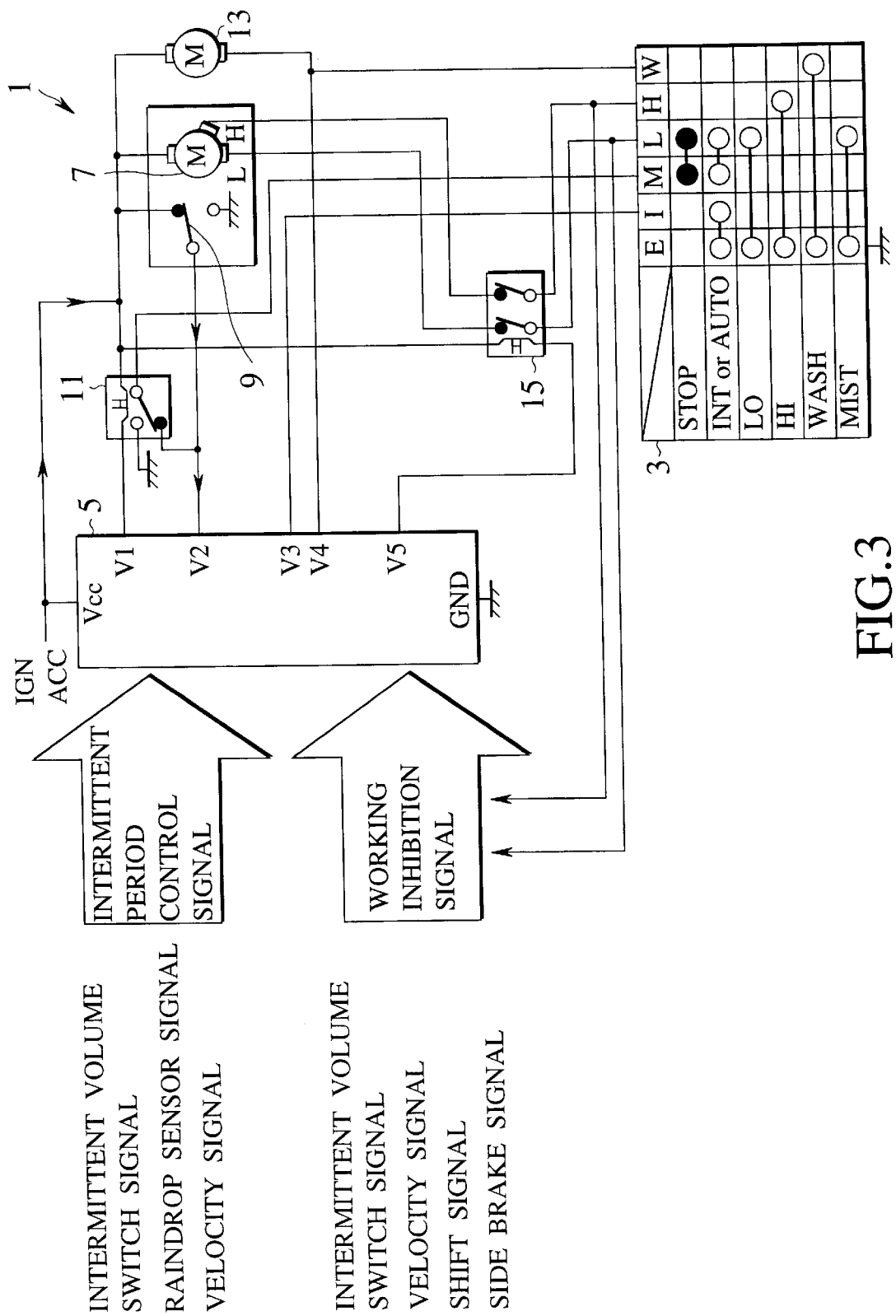
FIG. 3 is a circuit diagram of the windshield wiping device of FIG. 1, showing flows of currents at an "OFF" position of a wiper switch.

FIG. 3 shows a current flow when the wiper switch 3 is at the OFF position. As shown in the figure, when the wiper gets in position, the current from the power source flows into the control amplifier 5 through the AS switch 9 and finally flow into the ground. Thus, the current does not flow through the wiper motor 7, so that it is inactivated.

Figure 4:
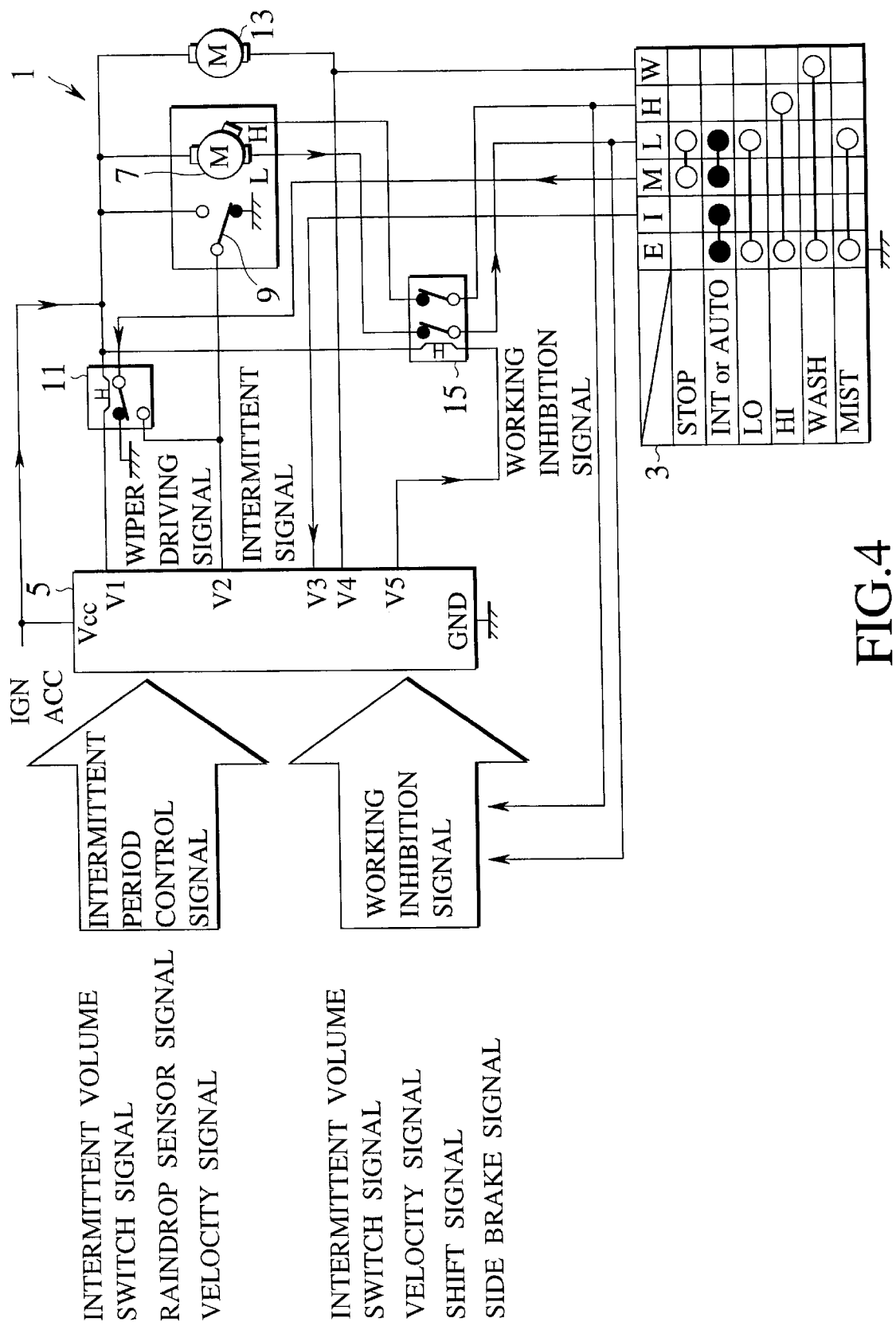
FIG. 4 is a circuit diagram of the windshield wiping device of FIG. 1, showing flows of currents at an "INT" position of the wiper switch.

FIG. 4 shows a current flow when the wiper switch 3 is at the "INT (intermittent)" or "AUTO (automatic)" position.

When the wiper switch 3 is operated to the "INT" or "AUTO" position under the power is being powered (IGN. ON), the intermittent signals are inputted into an input terminal V3 of the control amplifier 5, as shown in the figure. Receiving the intermittent signals, the control amplifier 5 controls the intermittent period on the basis of the intermittent volume switch signal representing the intermittent period adjusted by the intermittent period adjusting volume switch, the raindrop sensor signal and the vehicle speed signal, so that the wiper driving signals are outputted from an output terminal V1 at predetermined periods. Then, a solenoid coil of the working relay 11 is magnetized by the wiper driving signals, whereby the contact of the relay 11 is changed to the ground. Consequently, the current from the power source flows through the wiper motor 7, the wiper switch 3 (L) and the working relay 11 in order and finally into the ground. The wiper motor 7 is driven by the drive current slowly, thereby to actuate the wiper at a low speed. When a designated time has passed since the AS switch 9 was connected to the power source with the completion of one reciprocating motion of the wiper, the wiper driving signal is outputted from the output terminal V1 to operate the wiper at the low speed. By repeating the above-mentioned operation, the wiper can be operated intermittently.

On the other hand, when the vehicle is energized (power ON) under condition that the wiper switch 3 is at the "INT" or "AUTO" position, then the control amplifier 5 outputs the working inhibition signal through an output terminal V5. Thus, the solenoid coil of the working inhibition relay 15 is magnetized by the inhibition signal, so that the contacts of the relay 15 open. Accordingly, since the drive current does not flow through the wiper motor 7, the wiper is not activated.

Thereafter, when there is detected any one of the following events: a shifting of the vehicle from its stopped condition to the traveling condition detected by the vehicle speed signal; a shifting of a select lever from its "P (parking)" or "N (neutral)" position to the "D (drive)" or "R (reverse)" position; a shifting of an emergency (side) brake lever from its activated position to the inactivated position; a detection of manipulating the select lever or a button of the emergency brake lever; the driver's operation of the wiper switch 3; and the driver's operation of the intermittent period volume switch, then the control amplifier 5 stops to output the working inhibition signal in order to switch on the working inhibition relay 15. Thus, the driving current from the power source flows through the wiper motor 7, the wiper switch 3(L) and the working relay 11 in sequence and finally flows into the ground. At this time, the wiper motor 7 is driven at a low speed to work the wiper slowly.

Figure 5:
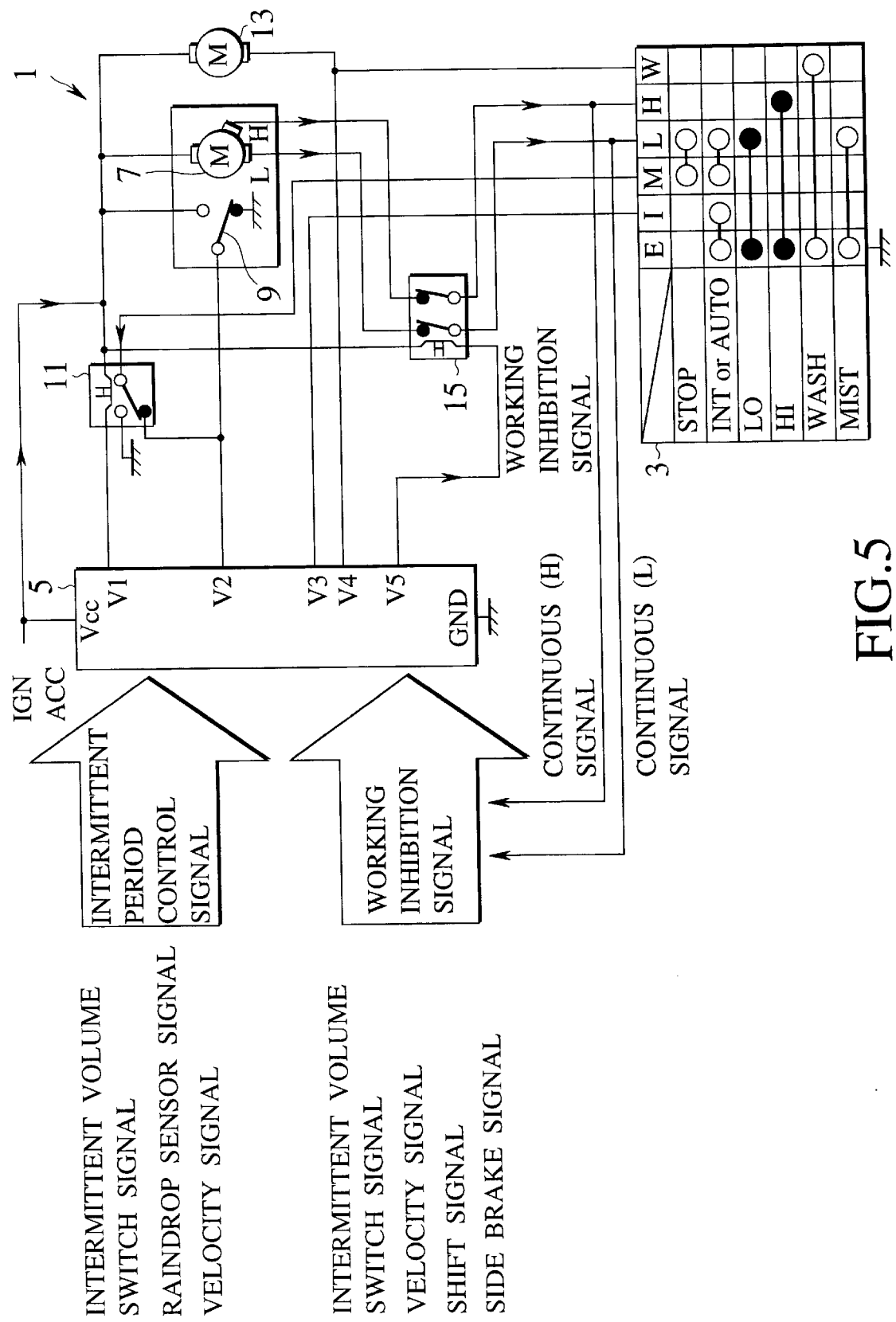
FIG. 5 is a circuit diagram of the windshield wiping device of FIG. 1, showing flows of currents at a "HI" or "LO" position of the wiper switch.

FIG. 5 shows a current flow when the wiper switch 3 is at the "HI" or "LO" position.

When the driver manipulates the wiper switch 3 to the "INT" or "AUTO" position under the vehicle is being powered (IGN. ON), the current from the power source flows through the wiper motor 7 (L (low) or H (high)), the wiper switch 3 (L or H) and the ground in order. The wiper motor 7 is successively driven by the drive current at a low or high speed, thereby to work the wiper slowly or rapidly. Further, in case of the "MIST" position of the wiper switch 3, the current from the power source flows into the ground by the way of the wiper motor 7 (L) and the sequent wiper switch 3 (L), as similar to the case of the "LO" position. Also in this case, the wiper motor is driven by the drive current to work the wiper at a low speed.

On the other hand, when the vehicle is energized (IGN. ON) under condition that the wiper switch 3 is at the "HI" or "LO" position, then the control amplifier 5 outputs the working inhibition signal through the output terminal V5. Thus, the solenoid coil of the working inhibition relay 15 is magnetized by the inhibition signal, so that the contacts of the relay 15 open. Accordingly, since the drive current does not flow through the wiper motor 7, the wiper is not activated.

Thereafter, when there is detected any one of the following events: the shifting of the vehicle from the stopped condition to the traveling condition detected by the vehicle speed signal; the shifting of the select lever from the "P (parking)" or "N (neutral)" position to the "D (drive)" or "R (reverse)" position; the shifting of the emergency (side) brake lever from the activated position to the inactivated position; the detection of manipulating the select lever or the button of the emergency brake lever; the driver's operation of the wiper switch 3; and the driver's operation of the intermittent period volume switch, then the control amplifier 5 stops to output the working inhibition signal in order to switch on the working inhibition relay 15. Thus, the driving current from the power source flows through the wiper motor 7, the wiper switch 3 (L) and the working relay 11 in sequence and finally flows into the ground. At this time, the wiper motor 7 is driven so as to actuate the wiper in accordance with the condition of the wiper switch 3.

Figure 6:
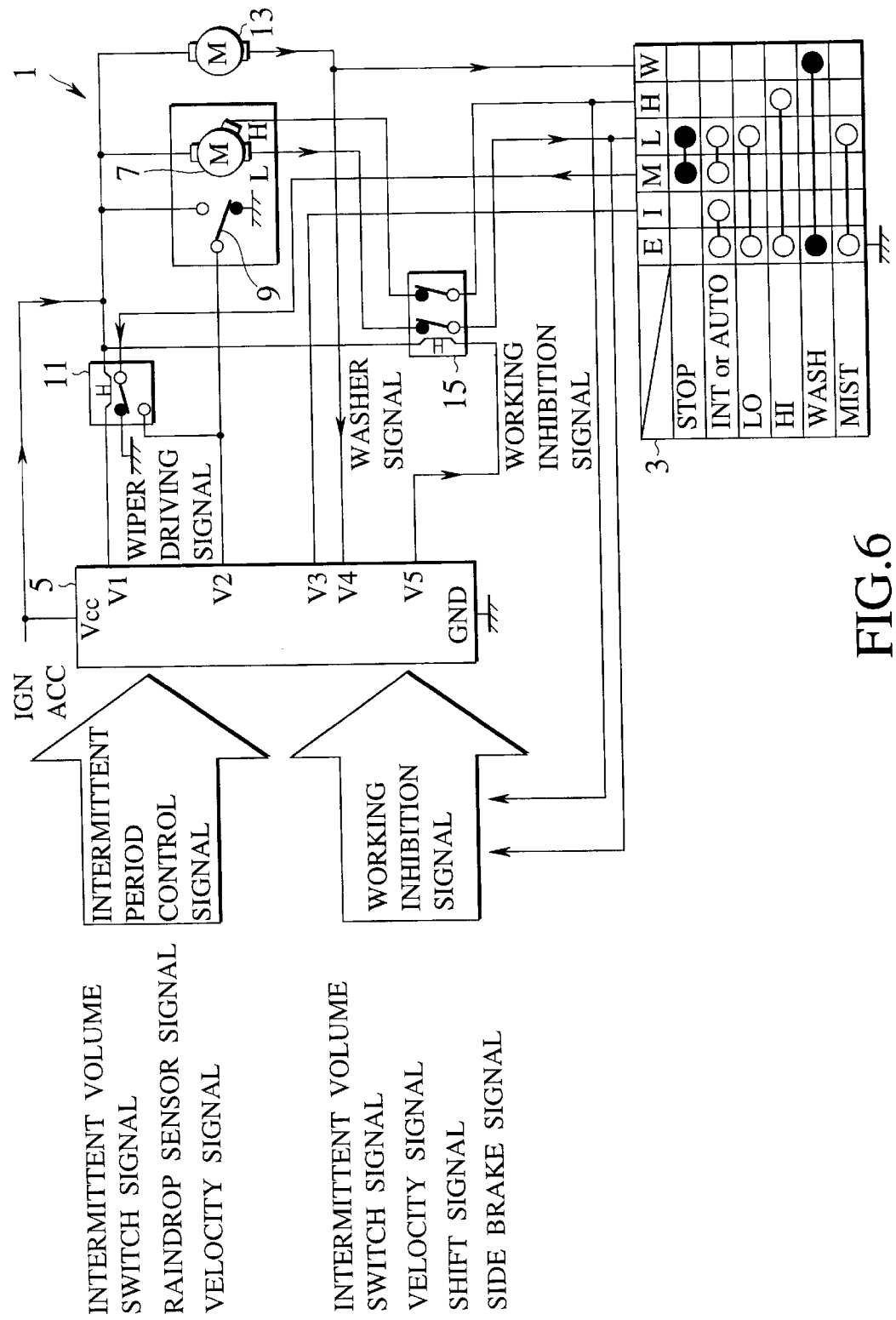
FIG. 6 is a circuit diagram of the windshield wiping device of FIG. 1, showing flows of currents at a "WASH" position of the wiper switch.

FIG. 6 shows a current flow when the wiper switch 3 is at the "WASH" position. As shown in the figure, when the driver manipulates the wiper switch 3 to the "WASH" position, the current from the power source flows into the ground by way of the washer motor 13, the wiper switch 3 (WASH). By the driving current, the washer motor 13 operates to eject the cleaning liquid toward the front windshield. After about 0.4 sec. has passed since the washer motor 13 begun to start, the control amplifier 5 generates a wiper driving signal through the output terminal V1. Thus, the solenoid coil of the working relay 11 is magnetized by the wiper driving signal, so that the contact of the relay 11 is changed to the ground. Thus, the driving current from the power source flows through the wiper motor 7, the wiper switch 3 (L) and the working relay 11 in order and flows into the ground finally. The wiper motor 7 is driven by the drive current at a low speed thereby to actuate the wiper continuously and slowly. Even after the wiper switch 3 has been operated to the "OFF" position, the control amplifier 5 continuously outputs the wiper drive signal from the output terminal for about 3 sec. to actuate the wiper at a low speed.

On the other hand, when the vehicle is energized (IGN. ON) under condition that the wiper switch 3 is at the "WASH" position, then the control amplifier 5 outputs the working inhibition signal through the output terminal V5. Thus, the solenoid coil of the working inhibition relay 15 is magnetized by the inhibition signal, so that the contacts of the relay 15 open. Accordingly, since the drive current does not flow through the wiper motor 7, the wiper is not activated.

Thereafter, when there is detected any one of the following events: the shifting of the vehicle from the stopped condition to the traveling condition detected by the vehicle speed signal; the shifting of the select lever from the "P (parking)" or "N (neutral)" position to the "D (drive)" or "R (reverse)" position; the shifting of the emergency (side) brake lever from the activated position to the inactivated position; the detection of manipulating the select lever or the button of the emergency brake lever; the driver's operation of the wiper switch 3; and the driver's operation of the intermittent period volume switch, then the control amplifier 5 stops to output the working inhibition signal in order to switch on the working inhibition relay 15. Thus, the driving current from the power source flows through the wiper motor 7, the wiper switch 3 (L) and the working relay 11 in sequence and finally flows into the ground. At this time, the wiper motor 7 is driven so as to actuate the wiper in accordance with the condition of the wiper switch 3.

Now, the above-mentioned operations of the windshield wiping device 1 are executed in accordance with a program stored in the memory of the control amplifier 5.

Figure 7:
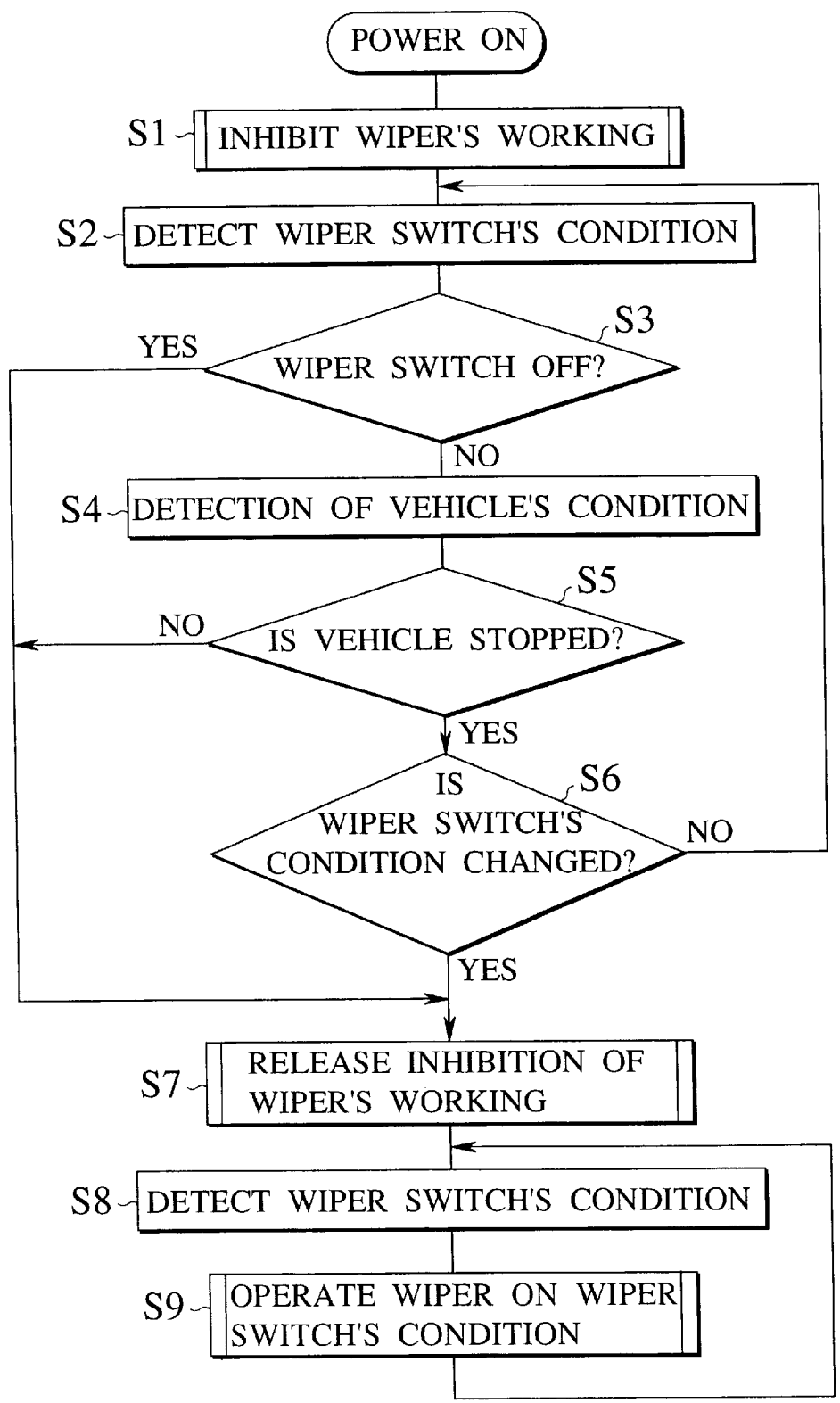
FIG. 7 is a flow chart for explanation of the control amplifier of the windshield wiping device of FIG. 1.

FIG. 7 is a flow chart for explanation of the operation of the control amplifier 5. Note, a routine executing processes shown in the figure is started whenever the driver switches the key switch on to energize the vehicle.

When the vehicle is energized, the routine goes to step S1 where it is executed to inhibit the working of the wiper at first. At next step S2, it is carried out to detect the present condition of the wiper switch 3, that is, which of the various positions "OFF", "INT (or AUTO)", "LO", "HI", "WASH" and "MIST" the wiper switch 3 does occupy.

At step S3, it is judged whether the wiper switch 3 is occupying the "OFF" position or not. When the judgement at step S3 is No, that is, when the wiper switch 3 occupies any one of the various positions except the "OFF" position, then the routine goes to step S4 where the vehicle's condition is detected by inputting the vehicle-speed signal, the shift signal, the side brake signal and so on. On the other hand, if the judgement at step S3 is Yes, that is, when the wiper switch 3 occupies the "OFF" position, then the routine goes to step S7.

At step S5, it is judged whether the vehicle is under the stopped condition or not. Hereat, in case that no vehicle-speed signal is generated, the select lever occupies the "P (parking)" or "N (neutral)" position or that the emergency brake lever is activated, it is judged that the vehicle does not travel. If the judgement at step S5 is Yes, that is, when the vehicle stops, the routine goes to step S6 where it is judged whether or not the position of the wiper switch 3 has changed. On the contrary, if the judgement at step S5 is No, the routine goes to step S7 since the vehicle is on the traveling condition.

If the judgement at step S6 is No, that is, when the wiper switch 3 still occupies the "OFF" position, the routine returns to step S2 to detect the condition of the wiper switch 3 newly. While, when the judgement at step S6 is Yes, then the routine goes to step S7.

At step S7, it is executed to release the working inhibition operation against the wiper motor 7, which has been established at step S1. At next step S8, it is carried out to detect the present condition of the wiper switch 3, that is, which of the various positions "OFF", "INT (or AUTO)", "LO", "HI", "WASH" and "MIST" the wiper switch 3 does-occupy and then the routine goes to step S9.

At step S9, the aforementioned operations of the wiping device 1 is carried out in accordance with the detected position of the wiper switch 3. position. After completing the process of step S9, then the routine returns to step S8 and so forth on.

In this way, when the vehicle is energized, the control amplifier 5 once outputs the working inhibition signal to the working inhibition relay 15 in order to open the contacts (step S1). That is, by restricting the drive current from flowing through the wiper motor 7, it is possible to avoid the wiper's working against the driver's will immediately after the key switch has been switched on ("ACC" or "IGN" position).

Further, when it is supposed that the vehicle begins to travel by detecting any one of the above-mentioned events (step S5), that is, the shifting of the vehicle from the stopped condition to the traveling condition detected by the vehicle speed signal; the shifting of the select lever from the "P (parking)" or "N (neutral)" position to the "D (drive)" or "R (reverse)" position; the shifting of the emergency (side) brake lever from the activated position to the inactivated position; the detection of manipulating the select lever or the button of the emergency brake lever or the like, then the control amplifier 5 stops to output the working inhibition signal to mutually contact the contacts of the inhibition relay 15 to each other, so that the wiper can be operated in accordance with the positioning of the wiper switch 3.

Additionally, when it is detected that the wiper switch 3 is operated by the driver (step S6), then the control amplifier 5 also stops to output the working inhibition signal to mutually contact the contacts of the inhibition relay 15 to each other, so that the wiper can be operated in accordance with the positioning of the wiper switch 3, which is the mirror of the driver's will.

Although the working inhibition relay 15 is arranged between the wiper motor 7 and the wiper switch 3 in the first embodiment, the present invention is not limited to the above arrangement only. For example, the relay 15 may be positioned between the wiper motor 7 and the power source in the modification.

Again, although the working inhibition relay 15 is employed as means for cutting off the driving current in the above-mentioned embodiment, it may be replaced with, for example, a transistor or the like.

(2nd. Embodiment)

Figure 8:
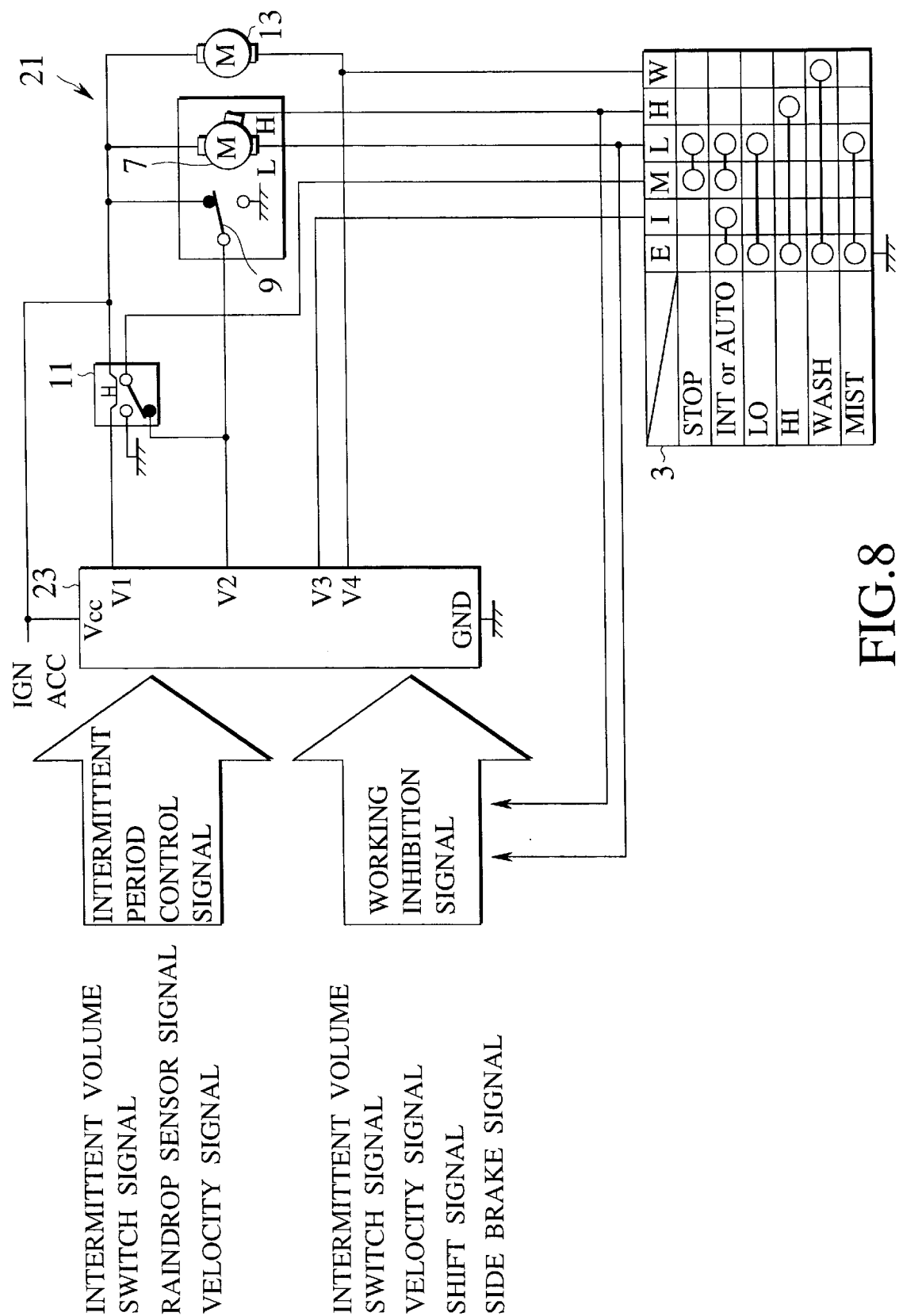
FIG. 8 is a systematic circuit diagram of a windshield wiping device in accordance with a second embodiment of the present invention.

We now describe the second embodiment hereinlater. FIG. 8 shows a circuit diagram of a windshield wiping device in accordance with the second embodiment of the present invention. The wiping device 21 of the embodiment is characterized in that a control amplifier 23 takes over the above-mentioned operations of the working inhibition relay 15 of the first embodiment.

In FIG. 8, when the wiper switch 3 occupies the "INT" position or the "AUTO" position, the control amplifier 23 drives the wiper on the basis of the intermittent period control signal representing the intermittent period of the wiper. Note, the intermittent period is calculated by the intermittent volume switch signal generated from the intermittent period adjusting volume switch, the raindrop sensor signal from the raindrop detecting sensor or the velocity signal from the vehicle-speed sensor. On the other hand, when the vehicle is energized (IGN. ON) under condition that the wiper switch 3 is at the "INT" or "AUTO" position, then the control amplifier 23 once outputs the working inhibition signal to restrict the working of the wiper. Then, the restriction of the wiper is removed on the basis of the working inhibition signal generated by any one of the intermittent volume switch signal, the vehicle-speed signal, the shift signal representing the manipulating condition of the gear-shift lever and the side brake signal representing the situation of the emergency brake lever.

The wiper device 21 operates as follows.

When the vehicle is energized (IGN. ON) under condition that the wiper switch 3 is at the "INT" position, then the control amplifier 23 outputs the working inhibition signal through the output terminal V1, so that the contact of the working relay 11 is opened.

Thereafter, when there is detected any one of the following events: the shifting of the vehicle from the stopped condition to the traveling condition detected by the vehicle speed signal; the shifting of the select lever from the "P (parking)" or "N (neutral)" position to the "D (drive)" or "R (reverse)" position; the shifting of the emergency brake lever from the activated position to the inactivated position; the detection of manipulating the select lever or the button of the emergency brake lever; the driver's operation of the wiper switch 3; and the driver's operation of the intermittent period volume switch, then the control amplifier 23 removes the restriction for output the wiper driving signal.

In this way, when the vehicle is powered on, the control amplifier 23 operates to restrict the outputting of the wiper driving signal. That is, by restricting the wiper's driving, it is possible to avoid the wiper's working against the driver's will right after the vehicle is powered on.

Finally, it will be understood by those skilled in the art that the foregoing description relates to preferred embodiments of the windshield wiping device, and that various changes and modifications may be made to the present invention without departing from the spirit and scope thereof.

What is claimed is:

1. A windshield wiping device for a vehicle comprising:
   a wiper for wiping a windshield of the vehicle;
   a wiper switch to be operated by a driver of the vehicle, for controlling the wiper, the wiper switch being capable of occupying various positions;
   a wiper motor for driving the wiper in accordance with the driver's operation of the wiper switch;
   a switch situation detecting section for detecting whether the wiper switch occupies any one of the various positions except an "OFF" position where the wiper is inactivated; and
   a current supply prohibiting section for prohibiting a supply of driving current to the wiper motor when the driver switches a key switch on while it is being detected that the wiper switch occupies any one of the various positions except the "OFF" position by the switch situation detecting section.

2. The windshield wiping device of claim 1, further comprising:
   a vehicle condition detecting section for detecting a change of the vehicle's condition on the basis of the driver's operation to travel the vehicle; and
   a current supply allowing section for allowing the supply of driving current to the wiper motor when the change of the vehicle's condition is detected by the vehicle condition detecting section after the supply of driving current has been prohibited by the current supply prohibiting section.

3. The windshield wiping device of claim 2, wherein the vehicle condition detecting section is adapted so as to detect any one of a beginning of traveling the vehicle, an operation of a gear shifting lever of the vehicle and a releasing of an emergency brake lever of the vehicle, as the change of the vehicle's condition.

4. The windshield wiping device of claim 3, wherein the various positions that the wiper switch can occupy contain at least an "INT" or "AUTO" position where the wiper is operated intermittently, a "LO" position where the wiper is operated slowly and a "HI" position where the wiper is operated rapidly.

5. A windshield wiping device for a vehicle comprising:
   a wiper for wiping a windshield of the vehicle;
   a wiper switch to be operated by a driver of the vehicle, for controlling the wiper, the wiper switch being capable of occupying various positions;
   a wiper motor for driving the wiper in accordance with the driver's operation of the wiper switch;
   a current supply prohibiting section for prohibiting a supply of driving current to the wiper motor when the driver switches a key switch on; and
   a current supply allowing section for withdrawing the prohibition of supplying the driving current to the wiper motor, which has been carried out by the current supply prohibiting section, when the wiper switch is operated by the driver.

6. The windshield wiping device of claim 5, wherein the various positions that the wiper switch can occupy contain at least an "OFF" position where the wiper is inactivated, an "INT" or "AUTO" position where the wiper is operated intermittently, a "LO" position where the wiper is operated slowly and a "HI" position where the wiper is operated rapidly.

* * * * *